US012761348B2

(12) United States Patent
Chung et al.

(10) Patent No.: US 12,761,348 B2
(45) Date of Patent: Oct. 13, 2026

(54) DYNAMIC DETECTION DEVICE AND DYNAMIC FOCUSING ALGORITHM

(71) Applicant: National Taipei University of Technology, Taipei (TW)

(72) Inventors: Ming-An Chung, Taipei (TW); Sung-Yun Chai, Taipei (TW); Chia-Chun Hsu, Taipei (TW); Ming-Chun Hsieh, Taipei (TW); Shang-Jui Huang, Taipei (TW); Kai-Shawn Chen, Taipei (TW); Jun-Hao Zhang, Taipei (TW); Zhi-Xuan Zhang, Taipei (TW)

(73) Assignee: National Taipei University of Technology, Taipei (TW)

( * ) Notice: Subject to any disclaimer, the term of this patent is extended or adjusted under 35 U.S.C. 154(b) by 0 days.

(21) Appl. No.: 19/204,855

(22) Filed: May 12, 2025

(65) Prior Publication Data

US 2026/0243889 A1 Aug. 20, 2026

Related U.S. Application Data

(60) Provisional application No. 63/758,501, filed on Feb. 14, 2025.

(51) Int. Cl.
*G01S 13/931* (2020.01)
*G01S 13/34* (2006.01)

(52) U.S. Cl.
CPC .......... *G01S 13/931* (2013.01); *G01S 13/343* (2013.01)

(58) Field of Classification Search
CPC ............................ G01S 13/931; G01S 13/343
USPC .......................................................... 348/143
See application file for complete search history.

(56) References Cited

U.S. PATENT DOCUMENTS

| | | | | |
|---|---|---|---|---|
| 5,398,095 | A * | 3/1995 | Tsukamoto | G02B 7/102 396/86 |
| 9,925,676 | B2 * | 3/2018 | Krenik | B26B 19/3806 |
| 10,721,384 | B2 * | 7/2020 | Schwager | H04N 23/72 |
| 11,040,458 | B2 * | 6/2021 | Krenik | B26B 21/4081 |
| 11,391,861 | B2 * | 7/2022 | Chen | G01S 13/887 |
| 11,480,427 | B2 * | 10/2022 | Lin | G01B 11/2513 |
| 2023/0146883 | A1 * | 5/2023 | Huang | G06F 3/017 715/863 |

FOREIGN PATENT DOCUMENTS

| | | | | |
|---|---|---|---|---|
| CN | 114397021 B | * 11/2022 | | G01S 13/50 |

* cited by examiner

*Primary Examiner* — John W Miller
*Assistant Examiner* — Omer Khalid
(74) *Attorney, Agent, or Firm* — Troutman Pepper Locke LLP; Tim Tingkang Xia, Esq.

(57) ABSTRACT

A dynamic detection device and a dynamic focusing algorithm of the present invention. The dynamic detection device comprises: a processing unit; a screen; a structured light sensor; a radar; an automatic zoom lens; an external power supply unit; and an internal power supply unit. The screen, the structured light sensor, the radar, the external power supply unit, and the internal power supply unit are all electrically connected to the processing unit. The radar is electrically connected to the automatic zoom lens.

9 Claims, 3 Drawing Sheets

DYNAMIC DETECTION DEVICE AND DYNAMIC FOCUSING ALGORITHM

CROSS-REFERENCE TO RELATED APPLICATIONS

This application claim priority to provisional application No. 63/758,501, filed on Feb. 14, 2025, which is herein incorporated by reference in its' integrity.

FIELD OF THE INVENTION

The present invention relates to a detection device and an operation method thereof, and more particularly to a dynamic detection device based on terahertz, sub-terahertz, millimeter wave and optics, and the operation method thereof.

BACKGROUND OF THE INVENTION

In the prior art, many countries are facing the problem of aging railway infrastructure, the problem of fatigue damage of aircraft structural materials, and the problem of common cracks, fatigue and damage in bridges and tunnels. These problems not only affect the efficiency of transportation, but also pose a huge threat to public safety. In particular, when the fatigue cracks appear in the aircraft materials, they will directly affect the integrity of the aircraft structure. If these cracks are not discovered early, they are likely to cause the aircraft to disintegrate, further causing a mortality rate of up to 90%. However, the current technical bottlenecks and limitations in detection technology make it difficult to detect many potential cracks or deformations in a timely manner, posing a serious threat to the stability of transportation vehicle structures.

Therefore, how to solve the above problems is an important issue that the industry currently needs to face and solve.

SUMMARY OF THE INVENTION

In view of this, the inventor of the present invention provides a detection technology with fast detection speed, high analysis precision, simple operation and comprehensive functions. In particular, the present invention provides a dynamic detection device based on terahertz, sub-terahertz, millimeter wave and optics, and the operation method thereof. The detection technology of the present invention can complete the task within 90 seconds. Compared with traditional ultrasonic and X-ray detections, the efficiency increases more than 5 times, which greatly shortens the detection cycle and is suitable for efficient industrial application scenarios. Regarding the analysis precision, the detection technology of the present invention has excellent imaging and thickness measurement capabilities, and can achieve micron (μm) and millimeter (mm) level analytical precision, for example, it can detect materials with a thickness of 5 μm. Furthermore, the detection technology of the present invention can also accurately distinguish the characteristics of different materials and is applicable to the detection needs of various material structures. Regarding operability and functionality, the detection method of the present invention has the ability to detect a variety of defects, including but not limited to debonding, delamination, dents, cracks, holes, water seepage, melting and lightning strikes. At the same time, no contact coupling agent is required during the detection process, further improving operational convenience. In addition, the detection technology of the present invention can avoid radiation hazards, ensure the safety of operation, and provide a high level of health protection for the operator. The comprehensive performance of the detection technology of the present invention effectively significantly improves detection efficiency and accuracy, while taking into account operational convenience and safety, and is an ideal solution to meet the needs of modern industrial detection.

Based on the above description, an aspect of the present invention is to provide a dynamic detection device, comprising:

- a processing unit;
- a screen;
- a structured light sensor being an optical sensor used to emit structured light and receive a reflected light signal;
- a radar being a radar sensor used to transmit and receive a radar signal;
- an automatic zoom lens,
- an external power supply unit, and
- an internal power supply unit,
- wherein the screen, the structured light sensor, the radar, the external power supply unit, and the internal power supply unit are all electrically connected to the processing unit; the radar is electrically connected to the automatic zoom lens; and the processing unit determines based on the radar signal received from the radar and the reflected light signal from the structured light sensor, and controls the automatic zoom lens to adjust a focal length.

According to one or more embodiments of the present invention, wherein the processing unit comprises a system-on-chip, a graphics processor, a random-access memory, and a hard disk.

According to one or more embodiments of the present invention, wherein the external power supply unit comprises an external power supply module.

According to one or more embodiments of the present invention, wherein the internal power supply unit comprises a charging module, a battery, and a voltage stabilizing module.

According to one or more embodiments of the present invention, wherein either the external power supply unit or the internal power supply unit may supply power to the processor unit when the dynamic detection device 1 is in operation.

According to one or more embodiments of the present invention, wherein the charging module is electrically connected to the battery, and the battery is electrically connected to the voltage stabilizing module.

Another aspect of the present invention is to provide a dynamic focusing algorithm, performed by the above-described dynamic detection device, comprising the following steps:

- a step of performing an initialization setup;
- a step of performing acquisition of A-Scan data;
- a step of performing extraction of target distance and peak;
- a step of performing calculation of an average intensity of all peaks;
- a step of performing confirmation on whether an optimal focal length is reached;
- a step of performing output of the optimal focal length and intensity;
- a step of performing adjustment of the focal length; and a step of performing repetition of a scan after updating the focal length.

DETAILED DESCRIPTION OF THE INVENTION

Figure 1:
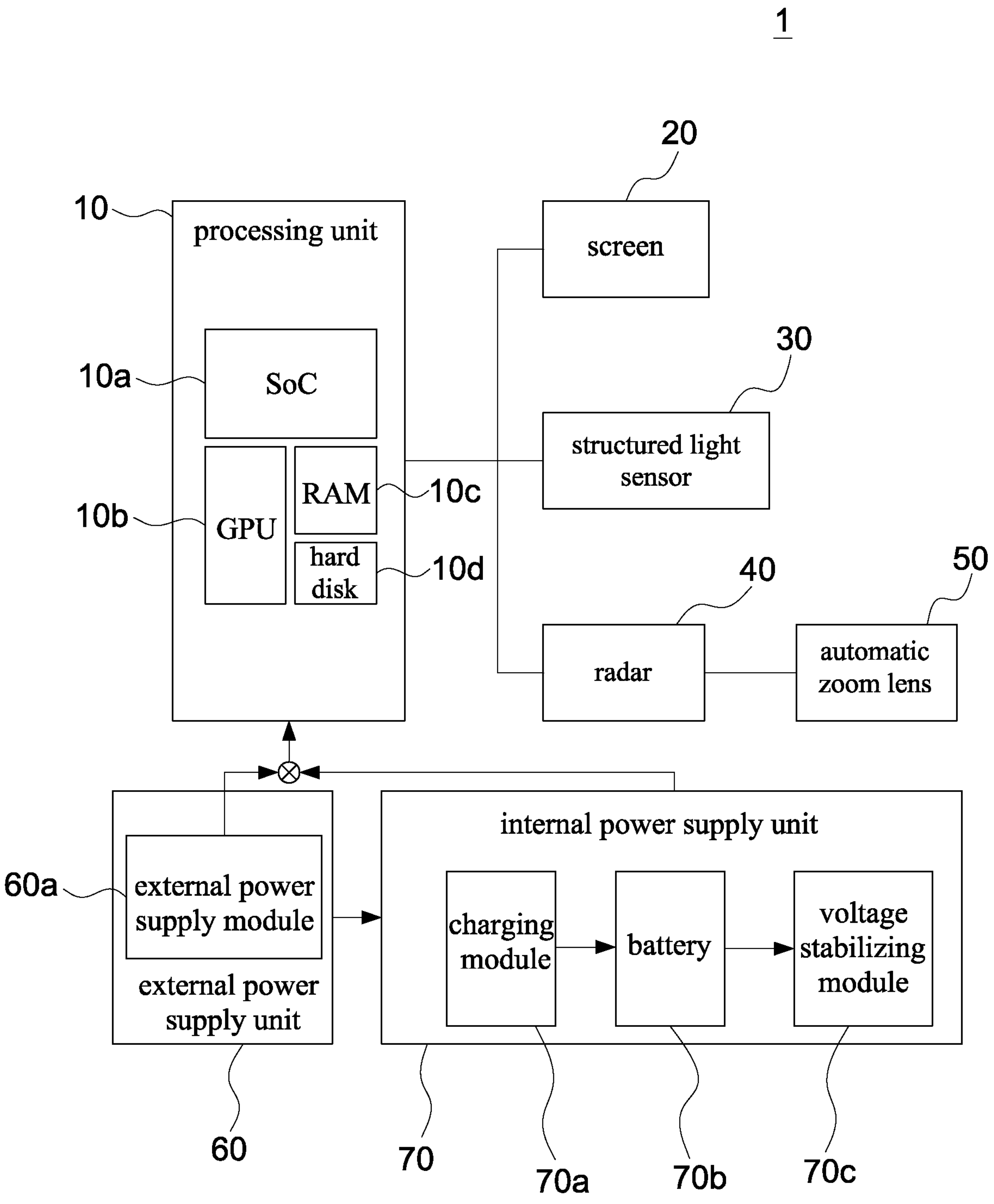
FIG. 1 is a schematic view of a dynamic detection device according to an embodiment of the present invention.

Embodiments of the present invention will now be described, by way of example only, with reference to the accompanying drawings.

First of all, it should be specially explained that the dynamic detection device described in an embodiment of the present invention is a portable imaging system with a terahertz, sub-terahertz or millimeter wave radar as a core sensor, supplemented by a camera, an infrared and structured light sensor, to achieve planar damage analysis, penetrating internal damage detection and advanced material structure analysis functions. The system can be widely used in fields such as aircraft maintenance, track inspection and building structure inspection.

As for terahertz imaging technology, it is an advanced detection technology that uses an electromagnetic wave with a frequency range between 0.1 THz and 10 THz for imaging. Because the terahertz wave has both electrical and optical properties, it has a unique advantage in the fields of material testing and imaging, and is known as "a combination of ultrasound and X-ray". The terahertz wave can penetrate non-metallic materials (such as plastics, fibers, ceramics, composite materials, etc.) and can be absorbed and reflected by different materials. Through reflection imaging and semi-perspective imaging, the terahertz technology can detect the internal structures of materials, identify defects such as cracks and damage, and further analyze the properties and the structures of the materials. The terahertz imaging technology is a non-contact detection technology that does not require the use of a coupling agent and is suitable for the detection of a curved surface and a difficult-to-contact area. The terahertz imaging technology has high penetrability and can penetrate a variety of non-conductive materials, such as composite materials, plastics and ceramics, to achieve the internal defect detection. The terahertz imaging technology has the characteristics of high-precision imaging, with medium to high resolution, and can clearly image and analyze the cracks, the damage and the material structures. In addition, the terahertz imaging technology is safe and radiation-free, belongs to non-ionizing radiation, is safe and harmless to the human body, and is easy to operate.

As for the structured light technology, it is an active depth sensing technology. The basic components comprise an IR emitter, an IR camera module, a RGB camera module, etc. The principle of the structured light technology is to first emit a light spot of a specific pattern to an object, then receive a light spot pattern coding (Light Coding) on the surface of the object through a camera, and then compare the similarities and differences with the original projected light spot, and use the triangulation principle to calculate the three-dimensional coordinates of the object. The advantage of the structured light technology is high depth accuracy, but its disadvantage is that it is easily affected by a natural light and is more suitable for short-distance measurement. It has been applied in fields such as face recognition, a somatosensory game console, and industrial machine vision inspection (AOI).

In an embodiment of the present invention, during the dynamic focusing operation of the system, a radar sensor first transmits and receives a radar signal as the main measurement basis, and a structured light sensor transmits and receives a structured light signal as an auxiliary signal. Both obtained signals are synchronously transmitted to a processing unit for analysis and determination, and then an automatic zoom lens is controlled to adjust a focal length. After the adjustment, the radar sensor and the structured light sensor respectively sense the signals at the new focal length again, and the aforementioned determination and adjustment steps are repeated until the optimal focal length is reached. Next, please refer to FIG. 1. FIG. 1 is a schematic diagram of a dynamic detection device according to an embodiment of the present invention. As shown in FIG. 1, in the embodiment of the present invention, a dynamic detection device 1 comprises a processing unit 10, a screen 20, a structured light sensor 30, a radar 40, an automatic zoom lens 50, an external power supply unit 60, and an internal power supply unit 70.

In an embodiment of the present invention, the screen 20, the structured light sensor 30, and the radar 40 are all electrically connected to the processing unit 10. In addition, the external power supply unit 60 and the internal power supply unit 70 are all electrically connected to the processing unit 10.

In an embodiment of the present invention, the processing unit 10 comprises a system-on-chip, a graphics processor, a random-access memory, and a hard disk.

In an embodiment of the present invention, the external power supply unit 60 comprises an external power supply module **60*a*. In an embodiment of the present invention, the internal power supply unit 70 comprises a charging module 70*a*, a battery 70*b*, and a voltage stabilizing module 70*c*. In an embodiment of the present invention, either the external power supply unit 60 or the internal power supply unit 70 may supply power to the processing unit 10 when the dynamic detection device 1 is in operation. For example, the internal power supply unit 70 first supplies power to the processing unit 10. When the power of the internal power supply unit 70 is exhausted, the external power supply unit 60 supplies power to the processing unit 10; or when the power of the internal power supply unit 70 is exhausted, the external power supply unit 60 charges the internal power supply unit 70, and then the internal power supply unit 70 supplies power to the processing unit 10. In an embodiment of the present invention, the charging module 70*a* is electrically connected to the battery 70*b*, and the battery 70*b* is electrically connected to the voltage stabilizing module 70*c***.

In addition, in an embodiment of the present invention, the radar 40 is electrically connected to the automatic zoom lens 50.

In an embodiment of the present invention, the dynamic detection device 1 integrates the processing unit 10 and the external power supply unit 60 or the internal power supply unit 70. In particular, the processing unit 10 comprises a system-on-chip (SoC) **10*a*, a graphics processor (GPU) 10*b*, a random-access memory (RAM) 10*c*, and a hard disk 10*d*** as mentioned above, and these components together constitute a core processing part and are connected to external devices through an interface.

In an embodiment of the present invention, after the radar 40 detects, the data is transmitted to the processing unit 10 through the interface for SAR imaging processing, and the result is plotted on the screen 20.

It should be illustrated again that, in an embodiment of the present invention, the dynamic detection device 1 provides two power supply modes. One is that the external power supply unit 60 directly supplies power, and the other is that the internal power supply unit 70 directly supplies power. As mentioned above, the internal power supply unit 70 comprises a charging module 70a, a battery 70b, and a voltage stabilizing module 70c. The design of the internal power supply unit 70 ensures the stable operation of the dynamic detection device 1 under the portability requirement.

Figure 2:
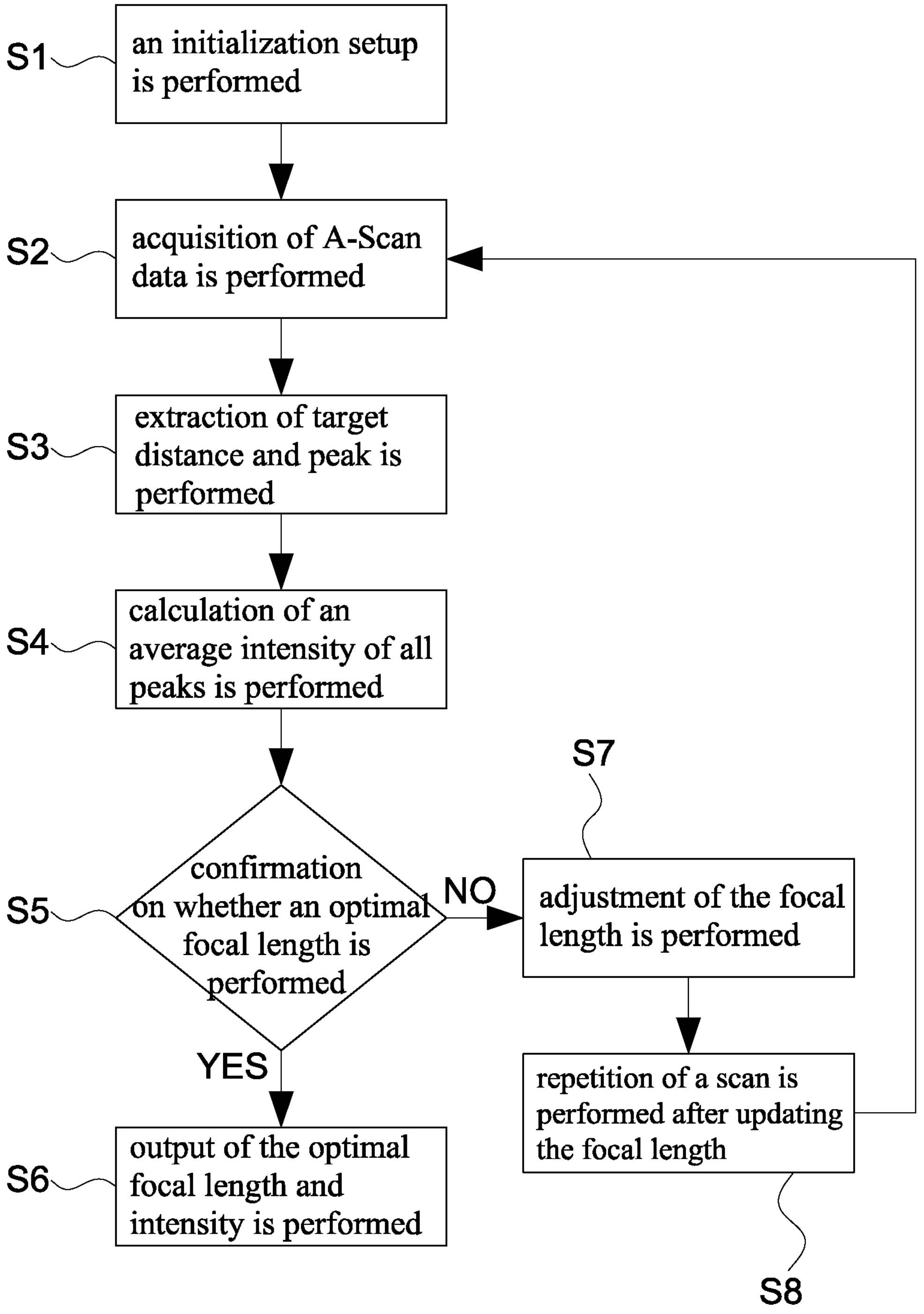
FIG. 2 is a flow diagram of a dynamic focusing algorithm performed in a dynamic detection device according to an embodiment of the present invention.

Next, please see FIG. 2. FIG. 2 is a flow diagram of a dynamic focusing algorithm performed in a dynamic detection device according to an embodiment of the present invention. As shown in FIG. 2, in the embodiment of the present invention, the dynamic focusing algorithm performed in the dynamic detection device 1 comprises steps S1 to S8 as described below. However, the steps S1 to S8 do not represent an absolute order of steps.

In the step S1, an initialization setup is performed. The whole process starts with an initialization setting, including setting basic parameters of the radar 40 such as the frequency range and including the focusing range and the step value of the lens of the automatic zoom lens 50. After that, the step S2 is followed.

In the step S2, acquisition of A-Scan data is performed. In the step S2, the radar 40 starts to work and acquires the A-Scan data by scanning. The data is the core of the whole process and is used for subsequent analysis. After that, the step S3 is followed. Wherein the radar transmitting wave band is terahertz, sub-terahertz, millimeter wave, etc. The A-Scan data is the data of the radar transmitting wave band of terahertz, sub-terahertz, millimeter wave, etc.

In the step S3, extraction of target distance and peak is performed. After acquiring the data, the dynamic detection device 1 extracts the information of the target distance and peak, analyzes characteristic points in the A-Scan waveform, and records the intensity value of each peak. After that, the step S4 is followed.

In the step S4, calculation of an average intensity of all peaks is performed. According to the intensity of these peaks, the average value is calculated as an important basis for determining the degree of focal length optimization. After that, the step S5 is followed.

In the step S5, confirmation on whether an optimal focal length is performed. That is, the dynamic detection device 1 evaluates whether the optimal focal length has been reached based on the current data. If yes, the optimal focal length is reached, and then the step S6 is followed. On the contrary, if not, the optimal focal length has not been reached, and then the step S7 is followed.

In the step S6, output of the optimal focal length and intensity is performed. Further, since the stop condition is met, the optimal focal length position and the corresponding maximum average intensity are outputted to complete the process.

In the step S7, adjustment of the focal length is performed. Next, the step S8 is followed.

In the step S8, repetition of a scan is performed after updating the focal length. Further, in the steps S7 and S8, since the optimal focal length has not been reached, the focal length position of the lens is further adjusted and updated according to the set step value, and the data acquisition and analysis processes are repeated. This iterative cycle continues until the focal length adjustment achieves the optimal result. The entire process optimizes the signal intensity of the target peak by dynamically adjusting the focal length and analyzing the data in real time.

Figure 3:
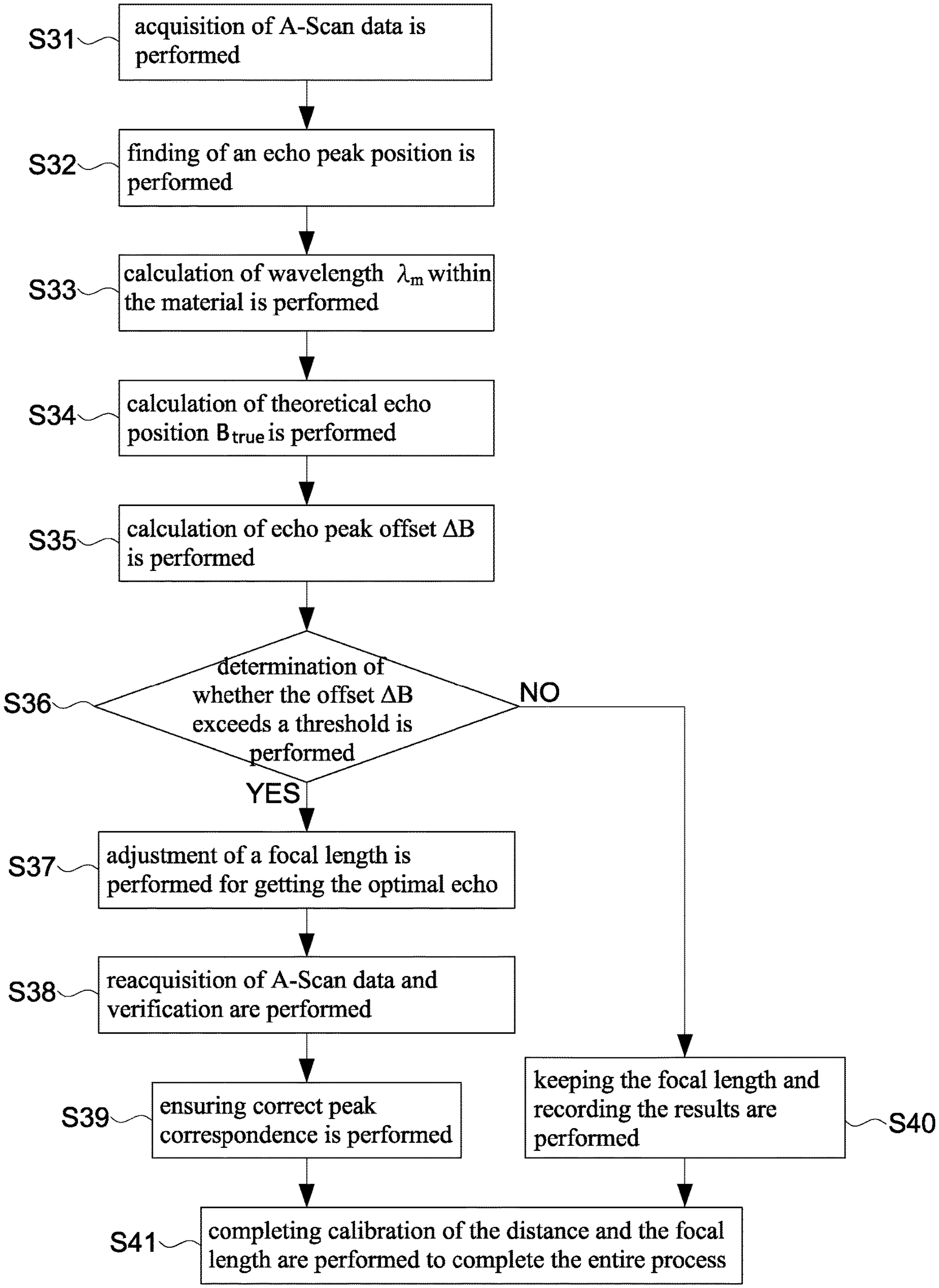
FIG. 3 is a flow diagram of determining whether the optimal focal length is achieved when a dynamic detection device is in operation according to an embodiment of the present invention.

After that, please see FIG. 3. FIG. 3 is a flow diagram of determining whether the optimal focal length is reached when a dynamic detection device is in operation according to an embodiment of the present invention. As shown in FIG. 3, in the embodiment of the present invention, Process of determining whether the optimal focal length is reached when the dynamic detection device 1 is in operation comprises steps S31 to S41 as described below. However, the steps S31 to S41 do not represent an absolute order of steps.

In the step S31, acquisition of A-Scan data is performed. After that, the step S32 is followed. The radar 40 transmits a signal and receives an echo reflected from the surface and the internal structure of a material. By analyzing the echo peaks and wavelength characteristics in the A-Scan data, it can confirm whether the focal length of the radar 40 is accurate and to correct the ranging deviation.

In the step S32, finding of an echo peak position is performed. After that, the step S33 is followed.

In the step S33, calculation of wavelength $\lambda_m$ within the material is performed. After that, the step S34 is followed.

In the step S34, calculation of theoretical echo position $B_{true}$ is performed. After that, the step S35 is followed.

In the step S35, calculation of echo peak offset ΔB is performed. After that, the step S36 is followed.

In the step S36, determination of whether the offset ΔB (i.e. the offset between the measured and theoretical peak positions) exceeds a threshold is performed. If yes, the step S37 is followed. On the contrary, if not, the step S40 is followed.

In the step S37, adjustment of a focal length is performed for getting the optimal echo. After that, the step S38 is followed.

In the step S38, reacquisition of A-Scan data and verification are performed. After that, the step S39 is followed.

In the step S39, ensuring correct peak correspondence is performed. After that, the step S41 is followed.

In the step S40, keeping the focal length and recording the results are performed. After that, the step S41 is followed.

In the step S41, completing calibration of the distance and the focal length are performed to complete the entire process.

It should be particularly illustrated that, in the embodiment of the present invention, when the focal length of the radar 40 is correct, the primary reflection peak of the A-Scan data corresponds to the known position of the material; the relationship between the echo wavelength and the material thickness is consistent with theoretical predictions, and the waveform is clear and does not diverge; when the focal length is in an optimal state, the echo signal intensity is the largest, the waveform is the sharpest, and there is no additional scattering or distortion within the range of the primary echo peak. In addition, when the focal length is incorrect, the echo peak position shifts, resulting in ranging errors; the waveform diverges, affecting the resolution, and the edge of the echo is blurred or delayed; the signal intensity is reduced, resulting in the inability to accurately analyze the internal structure of the material.

The embodiment of the present invention determines whether the optimal focal length is reached through the above method, including but not limited to the steps of peak position correspondence, wavelength analysis, focal length correction, etc., to ensure accurate ranging measurement and optimize focal length.

Further, in the above step of acquiring A-Scan data, the radar 40 transmits a signal, receives an echo, and records the corresponding relationship between the A-Scan intensity (Amplitude) and the range bin, and analyzes the range bin information to obtain the intensity distribution of the material echo.

In addition, in the above step of determining the echo peak position, in addition to finding the main peak of the echo through local peak detection, the range bin position Bmeans where the echo peak is located is also recorded, and Bmeans represents the echo peak position (Range Bin) measured by A-Scan.

Besides, in the above step of calculating the theoretical echo position, the theoretical echo position is based on the material thickness dtrue, the radar wavelength λm and the Range Bin Resolution. The Range Bin Resolution refers to the actual physical distance corresponding to each range bin in the digital processing unit of the radar. The echo peak position Btrue that should appear is calculated, as shown in the following equations (1) and (2):

$$B_{true} = \frac{d_{true}}{\lambda_m} \times \text{Range Bin Resolution} \tag{1}$$

$$\lambda_m = \frac{c}{nf} \tag{2}$$

wherein $\lambda_m$ is the radar wavelength within the material; n is the material refractive index; f is the radar frequency; c is the speed of light.

Moreover, in the step of confirming the peak offset, the peak position offset is calculated using the following formula (3):

$$\Delta B = B_{means} - B_{true} \tag{3}$$

wherein Bmeans represents the echo peak position (Range Bin) measured by A-Scan; Btrue represents the peak position that should appear in theory. If |ΔB| exceeds the allowable range, it indicates ranging error.

In addition, in the step of analyzing the relationship between the wavelength and the material thickness, the ratio of the material thickness to the wavelength is calculated using the following formula (4):

$$k = \frac{d_{true}}{\lambda_m} \tag{4}$$

wherein $d_{true}$ is the known standard material thickness; k is the ratio of the material thickness to the wavelength; $\lambda_m$ is the radar wavelength within the material. k is an integer, which may produce a standing wave effect and affect the resolution of the echo signal.

In addition, in the step of adjusting the radar focal length to obtain the optimal echo, when the focal length is optimal, the embodiment of the present invention satisfies the following conditions: (1) the main echo peak corresponds to the material thickness without additional offset; (2) the signal intensity is the highest, with no obvious scattering or blurred echoes; and (3) the edge of the reflected echo is clear and the signal width is the narrowest. The method for adjusting the focal length in the embodiment of the present invention is to change the distance between the radar antenna and the material, and to adjust the automatic zoom lens to make the echo strongest.

In an embodiment of the present invention, it is assumed that we use a millimeter wave radar to measure a material with a known thickness of 5 mm ($d_{true}$=0.005 m), the frequency of the radar is 10 GHz (f=1010 Hz), and the refractive index of the material is 2.5 (n=2.5). The dynamic detection device 1 transmits back the A-Scan and detects that the echo peak appears in the $200^{th}$ range bin ($B_{means}$=200). The Range Bin Resolution of the radar 40 is 0.1 mm/bin (0.00010.00010.0001 m/bin). The following steps are used to check whether the echo peak position is consistent with the actual thickness of the material and ensure that the error range is within ±1%.

First, the theoretical echo peak position is calculated. Theoretically, the echo peak $B_{true}$ should appear at 41.67. That is, according to the above formula (1), $$B_{true} = \frac{0.005}{0.012} \times \frac{1}{0.0001} = 41.67$$

is obtained.

Next, the ranging error is calculated. The measured peak value $B_{means}$=200 is checked and the offset is calculated, that is, according to the above formula (3), ΔB=200−41.67=158.33. Allowable error=0.01×$B_{true}$=0.4167.

Then, the focal length is corrected using a zoom lens. Since the focal length of the radar echo affects the position of the peak in the A-Scan, we can adjust the position of the peak by changing the focal length of the zoom lens. The relationship between the focal length change ΔF and the peak offset ΔB is shown in the following equation (5):

$$\Delta F = -\frac{\Delta B}{\text{Focal length adjustment factor}} \tag{5}$$

wherein the focal length adjustment factor depends on the radar resolution and the characteristics of the zoom lens. Assuming that each unit of the focal length adjustment of 10 mm will affect the range bin, then:

$$\Delta F = -\frac{158.33}{10} = -15.833 \text{ mm}$$

This means that the focal length should be shortened by 15.833 mm so that the echo peak corresponds to the correct position.

After that, the A-Scan is measured again. After adjusting the focal length, it is to obtain A-Scan data again and to confirm whether the main echo peak moves to the vicinity of $B_{true}$. Assuming that after the focal length correction, the new peak position is:

$$B_{means,new} = 41.5$$

$$\Delta B = 41.5 - 41.67 = -0.17$$

$$|\Delta B| = 0.17 < 0.4167$$

That means the error has reduced to an acceptable range and the focal length calibration is completed.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A dynamic detection device, comprising:

a processing unit, a screen, a structured light sensor, a radar, an automatic zoom lens, an external power supply unit, and an internal power supply unit, wherein the screen, the structured light sensor, the radar, the external power supply unit, and the internal power supply unit are all electrically connected to the processing unit; the radar is electrically connected to the automatic zoom lens; and the processing unit determines based on a radar signal received from the radar and a reflected light signal from the structured light sensor, and controls the automatic zoom lens to adjust a focal length.

2. The dynamic detection device according to claim 1, wherein the processing unit comprises a system-on-chip, a graphics processor, a random-access memory, and a hard disk.

3. The dynamic detection device according to claim 1, wherein the external power supply unit comprises an external power supply module.

4. The dynamic detection device according to claim 1, wherein the internal power supply unit comprises a charging module, a battery, and a voltage stabilizing module.

5. The dynamic detection device according to claim 1, wherein either the external power supply unit or the internal power supply unit may supply power to the processing unit when the dynamic detection device 1 is in operation.

6. The dynamic detection device according to claim 1, wherein the charging module is electrically connected to the battery, and the battery is electrically connected to the voltage stabilizing module.

7. The dynamic detection device according to claim 1, wherein a radar transmitting wave band is terahertz, sub-terahertz or millimeter wave.

8. A non-transitory computer-readable storage medium storing computer executable instructions, wherein the computer executable instructions are configured to be executed by a processor to implement a dynamic focusing algorithm performed by the dynamic detection device according to claim 1, the dynamic focusing algorithm comprising the following steps:

a step of performing an initialization setup;

a step of performing acquisition of A-Scan data;

a step of performing extraction of target distance and peak;

a step of performing calculation of an average intensity of all peaks;

a step of performing confirmation on whether an optimal focal length is reached;

a step of performing output of the optimal focal length and intensity;

a step of performing adjustment of the focal length; and a step of performing repetition of a scan after updating the focal length.

9. The non-transitory computer-readable storage medium according to claim 8, wherein the A-Scan data is data of the radar transmitting wave band of terahertz, sub-terahertz or millimeter wave in the step of performing acquisition of A-Scan data.

* * * * *